US012658051B2

(12) United States Patent
Emam et al.

(10) Patent No.: US 12,658,051 B2
(45) Date of Patent: Jun. 16, 2026

(54) PROBABILISTIC COLLISION DETECTION SYSTEM

(71) Applicant: Zoox, Inc., Foster City, CA (US)

(72) Inventors: Yousef Ali Emam, San Francisco, CA (US); Joseph Lorenzetti, Foster City, CA (US); Shahriar Sefati, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 16 days.

(21) Appl. No.: 18/791,188

(22) Filed: Jul. 31, 2024

(65) Prior Publication Data

US 2026/0038372 A1    Feb. 5, 2026

(51) Int. Cl.
| | |
|---|---|
| *G06N 20/00* | (2019.01) |
| *G06N 7/01* | (2023.01) |
| *G08G 1/056* | (2006.01) |
| *G08G 1/0967* | (2006.01) |
| *G08G 1/16* | (2006.01) |

(52) U.S. Cl.
CPC .............. *G08G 1/166* (2013.01); *G06N 7/01* (2023.01); *G08G 1/056* (2013.01); *G08G 1/096725* (2013.01); *G08G 1/164* (2013.01)

(58) Field of Classification Search
CPC ........ G08G 1/166; G08G 1/056; G08G 1/164; G08G 1/096725; G06N 7/01
See application file for complete search history.

(56) References Cited

U.S. PATENT DOCUMENTS

| | | | |
|---|---|---|---|
| 2020/0339116 A1* | 10/2020 | Xu .................. | B60W 30/18145 |
| 2020/0365033 A1* | 11/2020 | Cheng .................. | G08G 1/0145 |
| 2021/0139023 A1* | 5/2021 | Crego .................. | G06V 20/584 |
| 2021/0383690 A1* | 12/2021 | Cross ...................... | G08G 1/164 |
| 2022/0157168 A1* | 5/2022 | Newman ................ | G08G 1/017 |
| 2023/0339526 A1* | 10/2023 | Kernwein ............... | B61L 29/24 |

* cited by examiner

*Primary Examiner* — Dalena Tran
(74) *Attorney, Agent, or Firm* — Lee & Hayes, P.C.

(57) ABSTRACT

A vehicle trajectory may be evaluated based on a relative probability distribution associated with a vehicle and an object in the vehicle environment and/or based on velocities associated with the vehicle and/or the object. The relative probability distribution may be determined based on a vehicle trajectory and/or a predicted object trajectory. A collision probability and/or a collision severity may be determined based on the relative probability distribution and/or the velocities. The collision probability and/or severity may be used to determine whether the vehicle trajectory is safe and/or to inform the driving behavior of the vehicle.

20 Claims, 6 Drawing Sheets

300

RECEIVE A DIRECTIONAL RELATIVE POSITION DISTRIBUTION
300(A)

DIRECTIONAL RELATIVE POSITION DISTRIBUTION 302

DETERMINE A DISTANCE THRESHOLD
300(B)

DETERMINE INDEPENDENT COLLISION PROBABILITY
300(C)

DIRECTIONAL RELATIVE POSITION DISTRIBUTION 302

PROBABILITY 314

DISTANCE THRESHOLD 312

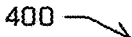
400

```
┌─────────────────────┐   ┌─────────────────────┐   ┌─────────────────────┐
│  DETERMINE (T-1)TH  │   │  DETERMINE TTH      │   │ DETERMINE A SEVERITY│
│ INDEPENDENT COLLISION│   │ INDEPENDENT COLLISION│  │      MEASURE        │
│     PROBABILITY      │   │     PROBABILITY     │   │        410          │
│        402           │   │        404          │   │                     │
└─────────────────────┘   └─────────────────────┘   └─────────────────────┘
```

DETERMINE (T-1)TH INDEPENDENT COLLISION PROBABILITY
402

DETERMINE TTH INDEPENDENT COLLISION PROBABILITY
404

DETERMINE A SEVERITY MEASURE
410

DETERMINE A COLLISION START PROBABILITY
406

DETERMINE A COLLISION PROBABILITY
408

DETERMINE COLLISION COST
412

DETERMINE TRAJECTORY
414

CONTROL VEHICLE
416

FIG. 4

500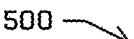

```
┌──────────────┐   ┌──────────────┐   ┌──────────────┐   ┌──────────────┐
│ DETERMINE    │   │ RECEIVE      │   │ DETERMINE    │   │ DETERMINE    │
│ VEHICLE      │   │ RELATIVE     │   │ OBJECT       │   │ VEHICLE MASS │
│ VELOCITY     │   │ POSITION     │   │ VELOCITY     │   │ AND OBJECT   │
│ DATA         │   │ VECTOR       │   │ DATA         │   │ MASS         │
│ 502          │   │ 504          │   │ 506          │   │ 512          │
└──────────────┘   └──────────────┘   └──────────────┘   └──────────────┘
```

DETERMINE VEHICLE VELOCITY DATA
502

RECEIVE RELATIVE POSITION VECTOR
504

DETERMINE OBJECT VELOCITY DATA
506

DETERMINE VEHICLE MASS AND OBJECT MASS
512

DETERMINE A FIRST DIRECTIONAL VELOCITY
508

DETERMINE A SECOND DIRECTIONAL VELOCITY
510

DETERMINE SEVERITY MEASURE
514

FIG. 5

PROBABILISTIC COLLISION DETECTION SYSTEM

BACKGROUND

Safety of passengers in a vehicle and other people or objects in proximity to the vehicle is of the utmost importance. Safety is often predicated on an accurate detection of a potential collision and timely deployment of a safety measure. Autonomous vehicles are often implemented with systems that have highly effective collision detection systems. However, computational resources may limit the ability of vehicle systems to fully account for evolution of environmental states which, in turn, may also limit the operation and effectiveness of such systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4 is a flowchart diagram of an example process for controlling a vehicle based on a determined collision cost associated with a candidate trajectory.

FIG. 5 is a flowchart diagram of an example process for determining a severity measure based on an environment state associated with a particular time.

DETAILED DESCRIPTION

Figure 1:
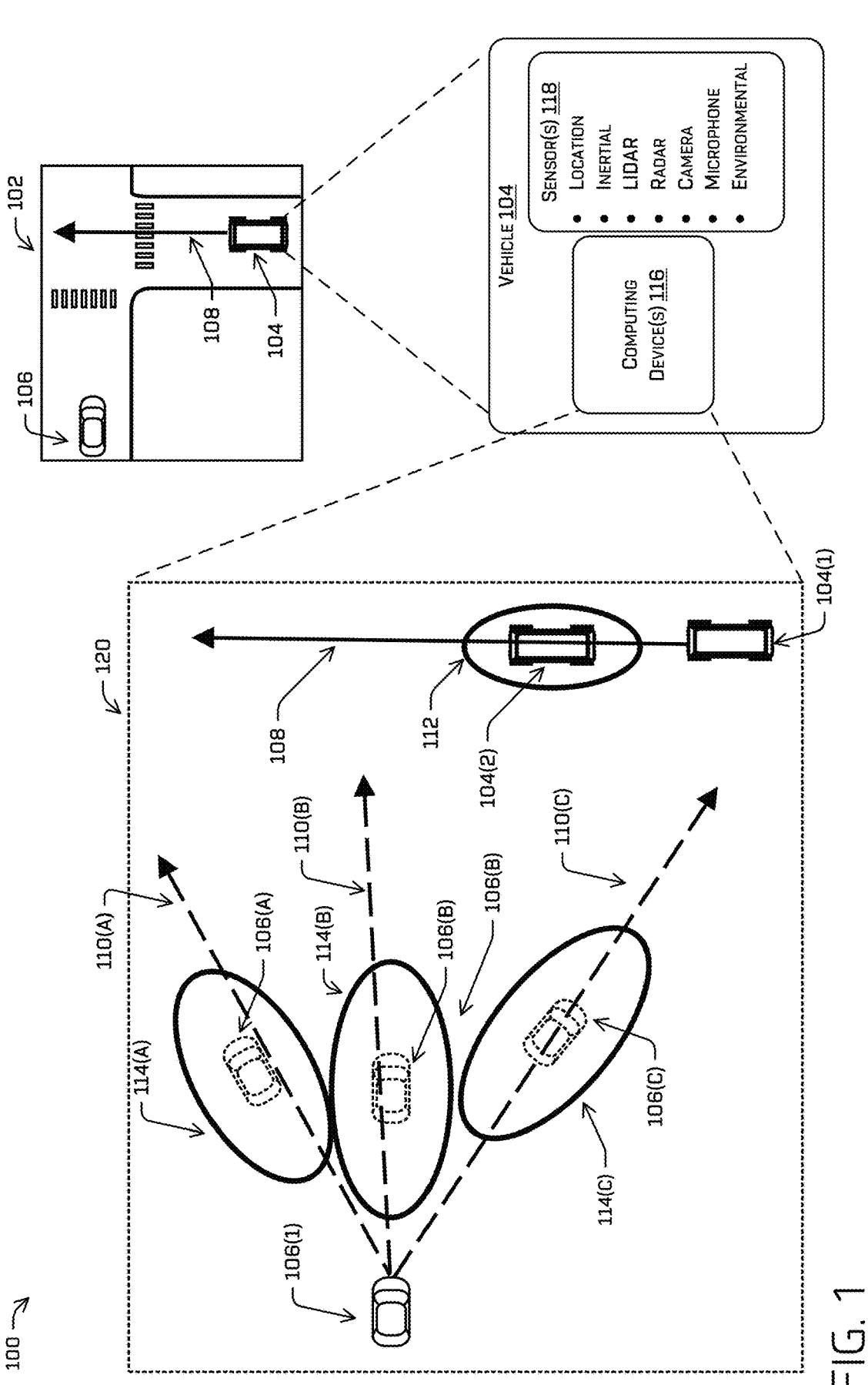
FIG. 1 depicts an example architecture for performing at least some of the techniques described herein.

This disclosure describes techniques for evaluating safety and effectiveness of a candidate vehicle trajectory based on, for example, a collision cost associated with a candidate vehicle trajectory. The collision cost may be determined based on a collision cost associated with the candidate vehicle trajectory, as well as accounting for uncertainties in positions between multiple objects. The collision cost may be determined based on: (i) a relative collision probability representing a likelihood that a collision occurs at a given time based on one or more collision probabilities associated with one or more preceding times, and (ii) a severity measure representing an expected severity of a collision at the given time based on an environment state associated with the given time (e.g., a detected environment state for a current time and/or a predicted environment for a future time). The collision probability associated with a given time may be determined based on a collision start probability representing a likelihood that a collision first starts at the given time (e.g., a likelihood of collision at that time assuming non-collision at a prior time). The collision start probability associated with a given time may be determined based on a deviation between an independent collision probability associated with that time and an independent collision probability associated with a preceding time. The independent collision probability may represent a likelihood that a corresponding time is associated with a collision as determined based on an environment state associated with that time (e.g., based on a vehicle position distribution and an object position distribution associated with that time). The severity measure associated with a given time may be determined based on velocity data and/or mass data associated with that time. In some instances, the severity may incorporate some aspects of probability. For example, uncertainties in predicted velocities may be used to modify the severity to be the severity given a threshold probability of an upper velocity associated with the object.

In some cases, the system determines a cost associated with a candidate vehicle trajectory based on a collision cost associated with the candidate vehicle trajectory (E(S)). In some cases, the system determines the collision cost based on a sum of incremental costs associated with a sequence of T times (e.g., where T may be ∞). The system may determine the incremental cost associated with a tth time based on: (i) a severity measure associated with the tth time, (ii) a collision probability associated with the tth time, and/or (iii) a collision probability associated with a time before the tth time. The incremental cost associated with a tth time may represent a deviation between a collision cost associated with the tth time (e.g., as determined based on the collision probability and the severity measure associated with the tth time) and a collision cost associated with a preceding time, such as with the $(t-1)$th time (e.g., as determined based on the collision probability and the severity measure associated with the preceding time).

For example, the system may deteremine the collision cost based on $$E(S) = \sum_{c=0}^{T} f(\theta_t)p(c_t) - p(c_{t-1}),$$

where: (i) $f(\theta_t)p(c_t)-p(c_{t-1})$ may represent the incremental cost associated with a time t, (ii) $p(c_t)$ represents the collision probability associated with the tth time, (iii) $p(c_t-1)$ represents the collision probability with the preceding $(t-1)$th time, (iv) $\theta_t$ represents a state of the environment at the tth time, and (v) $f(\theta_t)$ is the severity measure associated with the tth time as determined based on et. In some cases, the $p(c_t)-p(c_t-1)$ for t=0 may be determined based on the independent collision probability associated with that time $(g(\theta_0))$.

In some cases (e.g., for each time after an initial time), the system may determine the predicted collision probability associated with a tth time $(p(c_t))$ based on: (i) a collision start probability associated with the tth time representing a probability that a collision first occurs at the tth time (e.g., a probability of collision at the tth time given non-collision at a preceding time), and/or (ii) the collision probability associated with the preceding $(t-1)$th time. For example, in some cases (e.g., if t>0), the system may determine the predicted collision probability associated with a tth time $(p(c_t))$ based on $p(c_t)=p(c_t|n_{t-1})(1-p(c_{t-1}))+p(c_{t-1}))$, where: (i) $p(c_t|n_{t-1})$ may represent the collision start probability associated with the tth time (e.g., a probability that a collision first occurs at the tth time and/or a probability that the tth time associated with the collision given that the $(t-1)$th time is not), (ii) $p(c_{t-1})$ may represent the collision probability associated with the preceding $(t-1)$th time, (iii) $n_t$ may be a function that has a first value (e.g., a value of one) if the vehicle is predicted to not be in collision at an tth time and a second value (e.g., a value of zero) if the vehicle is predicted to be in collision at the tth time, and (iv) $c_j$ may be a function that has a first value (e.g., a value of one) if the vehicle is predicted to be in collision at a tth time and a second value (e.g., a value of zero) if the vehicle is predicted to not be in collision at the tth time. In some cases, $p(c_0)=g(\theta_0)$, where $g(\theta_0)$ is the independent collision probability associated with time t=0 as determined based on the state of the environment at that time ($\theta_0$).

In some cases, the system may determine the collision start probability associated with a tth time based on: (i) an independent collision probability associated with the tth time, and/or (ii) an independent collision probability associated with a preceding time (e.g. with the (t−1)th time). For example, the system may determine the collision start probability associated with a tth time based on at least one of (e.g., based on the greater of): (i) a fixed value (e.g., zero) representing a minimum collision start probability, or (ii) a second value determined based on the independent collision probability associated with the tth time and/or the independent collision probability associated with a preceding time (e.g. with the (t−1)th time). In some cases, the system may determine the collision start probability associated with a tth time based on $$p(c_t \mid n_{t-1}) = \max\{0, \frac{g(\theta_t - \theta_{t-1})}{1 - \theta_{t-1}}\},$$

where: (i) $g(\theta_t)$ is the independent collision probability associated with the tth time as determined based on the state of the environment at that time ($\theta_t$), and (ii) $g(\theta_{t-1})$ is the independent collision probability associated with the (t−1)th time as determined based on the state of the environment at that time ($\theta_{t-1}$).

In some cases, the system may determine the independent collision probability associated with a tth time based on: (i) a vehicle position distribution (e.g., a Gaussian probability distribution) associated with a vehicle's position at the tth time, and (ii) an object position distribution (e.g., a Gaussian probability distribution) associated with an object's (e.g., another vehicle's) position at the th time. The system may determine the independent collision probability associated with a tth time based on a relative position distribution (e.g., a Gaussian distribution) that represents a relationship between the vehicle's position at the tth time and the object's position at the tth time. The system may determine the relative position distribution based on the vehicle and object position distributions.

In some cases, the vehicle position distribution may be associated with the random variables $$X_t^v \text{ and } Y_t^v, \text{ where } X_t^v$$

represents a position of the vehicle associated with the tth time in one coordinate dimension (e.g., in the horizontal dimension), while represents a position $$Y_t^v$$

represents a position of the vehicle associated with the tth time in another coordinate dimension (e.g., in the vertical dimension). In some cases: (i) if $$t = 0, \text{ then } (X_t^v, y_t^v)$$

represents the current detected position of the vehicle, while (ii) if t>0, $$(X_t^v, Y_t^v)$$

represents the predicted vehicle position at a tth time in accordance with a candidate trajectory.

In some cases, the object position distribution may be associated with the random variables $$X_t^o \text{ and } Y_t^o, \text{ where } X_t^o$$

represents a position of an object (e.g., another vehicle) associated with the tth time in one coordinate dimension (e.g., in the horizontal dimension), while $$Y_t^o$$

represents a position of the object associated with the tth time in another coordinate dimension (e.g., in the vertical dimension). In some cases: (i) if t=0, then $$(X_t^o, Y_t^o)$$

represents the current detected position of the object, while (ii) if t>0, $$(X_t^v, Y_t^v)$$

represents the predicted object position at a tth time.

In some cases, the system determines the object position distribution based on one or more predicted object trajectories. For example, in some cases, to determine the object position distribution, the system determines a probability distribution whose mean is the object position associated with the tth time as determined based on a predicted object trajectory and/or whose covariance matrix represents the uncertainty associated with the predicted object trajectory in relation to the tth time (e.g., where the uncertainty may increase as t increases). In some cases, the system may determine the object position distribution based on (e.g., based on a combination and/or mixture of) D (e.g., three) distributions. Each of the D distributions may be determined based on a respective one of D predicted object trajectories. For example, each of the D distributions may be associated with: (i) a mean representing the object position represented by the respective one of the D predicted trajectories in relation to the tth time, and/or (ii) a covariance matrix representing the uncertainty associated with the predicted object trajectory in relation to the tth time. In some cases, given D distributions associated with D predicted object trajectories, the system may determine the object position distribution based on a combination and/or mixture of the D distributions. For example, if the D distributions are D Gaussian distributions, the system may determine the object position distribution based on a Gaussian mixture model determined based on the D distributions and/or based on D weights associated with the D distributions (e.g., where the weight of a distribution may represent a degree of confidence in the corresponding predicted object trajectory).

In some cases, the system determines the relative position distribution based on the object position distribution and the vehicle position distribution. For example, if the vehicle position distribution is associated with the random variables $$X_t^v \text{ and } Y_t^v$$

and the object position distribution is associated with the random variables $$X_t^o \text{ and } Y_t^o,$$

the relative position distribution may be associated with the random variables $$X_t^r = X_t^v - X_t^o \text{ and } Y_t^r = Y_t^v - Y_t^o.$$

In some cases, if the vehicle position distribution is a two-dimensional Gaussian distribution with the mean vector $$\mu_t^v$$

and the covariance matrix $$\Sigma_t^V,$$

and the object position distribution is a two-dimensional Gaussian distribution with the mean vector $$\mu_t^o$$

and the covariance matrix $$\Sigma_t^o,$$

then the relative position distribution may be a two-dimensional Gaussian distribution with a mean $$\mu_t = \mu_t^v - \mu_t^o$$

and a covariance matrix $$\Sigma_t = \Sigma_t^v - \Sigma_t^o.$$

The relative position distribution is an example of a relative probability distribution. The relative probability distribution may be determined based on a relationship associated with two or more probability distributions (e.g., associated with the vehicle position distribution and the object position distribution).

In some cases, the system determines the independent collision probability associated with the tth time based on the relative position distribution associated with that time. For example, in some cases, the system: (i) determines a directional relative position distribution (e.g., a one-dimensional distribution, such as a one-dimensional Gaussian distribution) based on a variance of the relative position distribution along a particular vector (e.g., along a directional vector determined based on positions associated with the vehicle and the object in relation to the tth time), and (ii) determines the independent collision probability based on the displacement distribution. The displacement distribution may represent the relationship between the vehicle position and the object position associated with the tth time along a particular vector, such as a vector determined based on positions associated with the vehicle and the object in relation to the tth time. In some cases, projecting a two-dimensional relative position distribution into a one-dimensional directional relative position distribution may cause the collision probability determination process to be more computationally efficient as performing operations on the one-dimensional distribution may be more efficient than performing operations on the two-dimensional distribution.

For example, in some cases, the system first determines a vehicle region and an object region associated with a tth time. The vehicle region may correspond to a region of the environment that includes a detected and/or predicted position of a vehicle associated with the tth time (e.g., a detected position if t=0 and/or a predicted position if t>0). For example, the vehicle region may include, or otherwise be modeled by, a geometric shape (e.g., a capsule) that includes (e.g., is centered at) the detected and/or predicted position of the vehicle associated with the tth time. A geometric feature (e.g., a radius) of the capsule may be determined based on a determined size and/or a determined classification of the vehicle (e.g., based on determining that the vehicle is a sedan). The object region may correspond to a region of the environment that includes a detected and/or predicted position of an object associated with the tth time (e.g., a detected position if t=0 and/or a predicted position if t>0). For example, the object region may include a geometric shape (e.g., a capsule) that includes (e.g., is centered at) the detected and/or predicted position of the object associated with the tth time. A geometric feature (e.g., a radius) of the capsule may be determined based on a determined size and/or a determined classification of the object (e.g., based on determining that the object is a sedan vehicle, based on determining that the object is a bicycle, and/or the like). Example techniques for determining vehicle regions based on geometric shapes and/or areas (e.g., capsules) are described in U.S. patent application Ser. No. 18/679,987, entitled "Determining Adversarial Cost Based on Generated Deviations" and filed on May 31, 2024, which is incorporated by reference herein in its entirety and for all purposes.

In some cases, the system determines a direction vector (e.g., an inertial direction vector) associated with the tth time based on the vehicle region and the object region associated with the tth time. For example, the system may determine a point $p_v$ from the vehicle region and a point $p_o$ from the object region. The point $p_v$ may, for example, be the closest point in the vehicle region to the object region, while the point $p_o$ may, for example, be the closest point in the object region to the vehicle region. In some cases, the system determines the direction vector based on these two points (e.g., determines the direction vector based on a vector that crosses both points). For example, the system may determine the direction vector ($\Delta\hat{p}$) based on $$\Delta\hat{p} = \frac{p_v - p_a}{\|p_v - p_a\|}.$$

In some cases, the direction vector is a normalized vector and/or a unit vector.

In some cases, the system determines a directional relative position distribution (e.g., a one-dimensional distribution, such as a one-dimensional Gaussian distribution) based on the relative position distribution (e.g., a two-dimensional distribution, such as a two-dimensional Gaussian distribution) and the direction vector. In some cases, the system determines the variance of the directional relative position distribution based on a variance of the relative position distribution along the direction vector. For example, if the relative position distribution is associated with a mean $$\mu_t = \begin{pmatrix} \mu_{t\_x} \\ \mu_{t\_y} \end{pmatrix}$$

and the covariance matrix $$\sum{}_t = \begin{pmatrix} \sigma_{xx} & \sigma_{xy} \\ \sigma_{xy} & \sigma_{yy} \end{pmatrix},$$

and if direction vector is $$\Delta\hat{p} = \begin{pmatrix} \Delta\hat{p}_x \\ \Delta\hat{p}_y \end{pmatrix},$$

then: (i) the mean of the directional relative position distribution $$\left(\mu_t^d\right)$$

may be determined based on $$\mu_t^d = \Delta\hat{p}^T \mu_t = \Delta\hat{p}_x \mu_{t\_x} + \Delta\hat{p}_y \mu_{t\_y},$$

and/or (ii) the variance of the directional relative position distribution $((\sigma^d)^2)$ may be determined based on $$\left(\sigma^d\right)^2 = \Delta\hat{p}_x^2 \sigma_{xx} + 2\Delta\hat{p}_x \Delta\hat{p}_y \sigma_{xy} + \Delta\hat{p}_y^2 \sigma_{yy}.$$

In some cases, the system determines the independent collision probability associated with a tth time based on at least one of: (i) the directional relative position distribution associated with the tth time, and (ii) a distance threshold associated with the tth time. In some cases, the system determines the independent collision probability based on the output of evaluating the cumulative density function (CDF) associated with the directional relative position distribution with respect to the distance threshold. For example, in some cases, if the distance threshold associated with the tth time is d, the system determines the tth time's independent collision probability ($g(\theta_t)$) based on $(1-F(d))$, where $F(d)$ is the output of determining the CDF associated with the directional relative position distribution with respect to d. In some cases, the system determines the distance threshold associated with the tth time based on a vehicle position and an object position (e.g., a vehicle region and an object region) associated with that time. In some cases, the system determines the distance threshold based on at least one of: (i) a closest point in the vehicle region to the object region, the closest point in the object region to the vehicle region, (iii) a geometric feature (e.g., a radius) of the vehicle region, or (iv) a geometric feature (e.g., a radius) of the object region. For example, the system may determine the distance threshold (d) based on $d=\|p_v-p_o\|-r_v-r_a$, where: (i) $p_v$ may be the closest point in the vehicle region to the object region, (ii) $p_o$ may be the closest point in the object region to the vehicle region, (iii) $r_v$ may be the radius of the vehicle region, and (iv) $r_o$ may be the radius of the object region.

In some cases, the output of evaluating the CDF associated with the tth time's directional relative position distribution with respect to a particular value may be used to determine the likelihood that the vehicle region and the object region are closer to each other than the distance represented by the particular value at the respective tth time (e.g., representing that the vehicle and the object are in collision). For example, in some cases, given a value x, the likelihood that the vehicle and object are closer to each other than x is represented by $(1-F(x))$, where $F(x)$ is the output of determining the CDF associated with the directional relative position distribution with respect to x. The value of x may, for example, be determined based on a closest distance between the vehicle region and the object region. In some cases, the directional relative position distribution is determined in a manner such that $(1-F(0))=0.50$, because given a vehicle region and an object region that are detected to be tangent to each other, there is a fifty percent likelihood that the two regions are closer to each other than the distance represented by the positions of the detected regions and a fifty percent likelihood that the two regions are farther away from each other than the distance represented by the positions of the detected regions.

Accordingly, in some cases, the system determines the independent collision probability associated with a tth time based on at least one of: (i) the directional relative position distribution associated with the tth time, or (ii) a distance threshold associated with the vehicle region and the object region associated with the tth time. For example, the system may determine the independent collision probability based on an area under the curve associated with the independent collision probability that corresponds to the distance between the vehicle region and the object region along the direction vector being less than the directional distance. As described above, the determined independent collision probability may then be used to determine a collision start probability representing the likelihood that a collision starts at the corresponding tth time. The collision start probability may then be used to determine a collision probability associated with the tth time. The collision probability may then be used to determine the collision cost associated with the tth time. For example, in some cases, the system may determine the collision cost based on the collision probability and a severity measure.

The severity measure associated with a tth time may represent a prediction about how severe a collision occurring at the tth time may be based on a state of the environment at the tth time. Accordingly, in some cases, while the collision probability associated with the tth time captures a prediction about how likely a collision is at the tth time, the severity measure is a prediction about the magnitude of a collision at the tth time assuming such a collision occurs. In some cases, the system combines the collision probability associated with the tth time and the severity measure associated with the tth time to determine an incremental cost. The incremental cost associated with a tth time may represent a deviation between a collision cost associated with the tth time (e.g., as determined based on the collision probability and the severity measure associated with the tth time) and a collision cost associated with a preceding time, such as with the (t−1)th time (e.g., as determined based on the collision probability and the severity measure associated with the preceding time). The system may then combine the incremental costs associated with a sequence of T times to determine the collision cost associated with a candidate trajectory with respect to the sequence. In some cases, while combining the incremental costs associated with a sequence of T times starting from a first time to a Tth time, the system stops the combination if the combined cost reaches a defined value (e.g., a maximum value, such as one). After stopping the combination, the system may determine a cost for the trajectory based on the defined value.

In some cases, the system determines the severity measure associated with a tth time based on a state of the environment at the tth time. For example, the system may determine the severity measure based on at least one of: (i) a detected velocity associated with the vehicle at the tth time ($V_v$), (ii) a detected velocity associated with the object at the tth time ($V_a$), (iii) a mass associated with the vehicle ($M_v$) (e.g., as determined based on the output a weight sensor and/or based on a classification of the vehicle, for example based on determining that the vehicle is a sedan), (iv) a mass associated with the vehicle ($M_v$) (e.g., as determined based on the output a weight sensor and/or based on a classification of the object, for example based on determining that the object is a sedan vehicle or that the object is a pedestrian), or (iv) a relative position vector associated with the vehicle and the object at the tth time ($\hat{p}$). The relative position vector may, for example, be the direction vector described above. In some cases, the system determines the relative position vector ($\hat{p}$) based on $$\hat{p} = \frac{p_v - p_a}{\|p_v - p_a\|},$$

where $p_v$ is a position associated with the vehicle at the tth time (e.g., a position in the vehicle region associated with the vehicle that is closest to an object region associated with the object) and $p_o$ is a position associated with the vehicle at the tth time (e.g., a position in the object region associated with the object that is closest to the vehicle region associated with the vehicle).

In some cases, the system determines the severity measure associated with the tth time based on: (i) an initial closing speed representing a deviation between the vehicle's detected velocity ($V_v$) and the object's detected velocity ($V_o$) across the relative position vector ($\hat{p}$), (iii) a mass associated with the vehicle ($M_v$), and (iv) a mass associated with the object ($M_o$). In some cases, the system determines the severity measure ($f(\theta_t)$) based on $f(\theta_t)=$ $$\left(\frac{M_o}{M_o + M_v}\hat{p}^T(V_V - V_a)\right)^2 + \left(\frac{M_v}{M_o + M_v}\hat{p}^T(V_V - V_a)\right)^2.$$

In some cases, $\hat{p}^T(V_v - V_a)$ is an initial closing speed ($S_0$), while $$\frac{M_v}{M_o + M_v}$$

is a mass ratio ($m_r$) representing a ratio of the vehicle mass and the object mass. Accordingly, the system determines the severity measure ($f(\theta_t)$) based on $$f(\theta_t) = (m_r S_0)^2 + ((1 - m_r)S_0)^2 = \left(m_r^2 + (1 - m_r)^2\right)S_0^2.$$

In some cases, the mass associated with the vehicle ($M_v$) and the mass associated with the object ($M_o$) are associated with the vehicle and the object's classification (e.g., type), respectively. Accordingly, in some cases, the system determines the severity measure ($f(\theta_t)$) based on $$f(\theta_t) = w_o S_0^2,$$

where $w_o$ is a weight associated with the object as determined based on the vehicle's classification and the object's classification. In some cases, using the mass ratio to determine the severity measure may be beneficial because the severity measure is determined based on a combined relative space associated with the vehicle and the object.

After the system determines the severity measure ($f(\theta_t)$) and the collision probability associated with the tth time in accordance with a candidate trajectory, the system may combine the two values to determine the incremental cost associated with that time. For example, the system may determine the incremental cost associated with the tth time based on $f(\theta_t)(p(c_t)-p(c_{t-1}))$, where $p(c_t)$ may be the collision probability associated with the tth time and $p(c_{t-1})$ may be the collision probability associated with the (t−1)th time. The system may then combine the incremental costs across a sequence of T times to determine the overall collision cost ($E(S)$) for a candidate vehicle trajectory over that time sequence. For example, the system may determine the collision cost based on $$E(S) = \sum_{t=0}^{T} f(\theta_t)(p(c_t) - p(c_{t-1})),$$

where (i) $f(\theta_t)p(c_t)-p(c_{t-1})$ may represent the incremental cost associated with a time t. In some cases, the value is T is determined based on the amount of available computational resources and/or based on a predefined trajectory evaluation time window.

In some cases, the system determines the collision cost associated with a candidate trajectory across a sequence of T times (e.g., over a set of predicted positions for the two objects). This collision cost may be used to determine a collision cost associated with the candidate trajectory. The collision cost may represent a likelihood that the candidate trajectory leads to a collision and/or the severity measure of such a collision if it were to occur. The system may then use the collision cost to determine whether to adopt or reject the candidate trajectory. For example, the system may combine the collision with one or more other cost measures to determine a total cost associated with the candidate trajectory. The system may then select the candidate trajectory with the lowest cost.

In some cases, given a set of predicted object trajectories associated with an object, the system: (i) determines a cost value for each of the predicted object trajectories (e.g., using the techniques described above), and (ii) determines a cost associated with collision with an object based on a combination (e.g., an average, a weighted average, and/or the like) of the cost values for the predicted object trajectories. In some cases, given a set of objects in an environment, the system determines a cost value for each of the objects, and then determines a total cost for a vehicle trajectory being evaluated based on a combination (e.g., an average, a weighted average, and/or the like) of the cost values for the set of objects. For example, given A objects each associated with B predicted trajectories (e.g., therefore, a total of A*B predicted object trajectories), the system may proceed as follows: (i) for each of the A*B predicted object trajectories, determine (e.g., using the techniques described above) a per-trajectory cost value (e.g., associated with a probability and/or severity of colliding with the respective object if the object follows the predicted object trajectory and the vehicle follows a trajectory being evaluated), (ii) for each of the A objects that is associated with B predicted object trajectories, combine the B cost values associated with the B predicted object trajectories to determine a per-object cost value (e.g., associated with a probability and/or severity of colliding with the respective object if the vehicle follows a trajectory being evaluated), and (iii) determine a total cost (e.g., associated with the trajectory being evaluated leading to collision and/or the severity of such a collision if it occurs) by combining the A per-object cost values associated with the A objects. In some cases, one or more of the costs determined in accordance with the techniques described herein (e.g., the total cost associated with a vehicle trajectory being evaluated) may be determined during a process configured to determine a trajectory for the vehicle, for example using one or more tree-based trajectory determination techniques and/or one or more trajectory determination techniques using optimization (e.g., direct optimization, stochastic optimization, and/or the like).

A tree-based technique for trajectory determination may include determining a tree structure based on a set of proposed actions for a vehicle to take to traverse an environment. A branch of the tree structure may include a node (e.g., a state node representing a detected and/or predicted state of the environment, an action node representing an action, and/or the like). The tree-based technique may involve expanding the tree structure by determining, for one or more branches of the tree structure, one or more child nodes representing states that result from the vehicle taking the action represented by the action node of the branch. The system may determine one or more trajectory costs for a branch by evaluating the one or more trajectory costs based on the action represented by the action node and/or the state represented by one or more state nodes of the branch. Example techniques for determining trajectories using a tree-based technique are described in U.S. Pat. No. 11,360,477, filed on Jun. 22, 2020 and entitled "Trajectory Generation using Temporal Logic and Tree Search," and U.S. Pat. No. 10,671,076, filed on Dec. 6, 2017 and entitled "Trajectory Prediction of Third-Party Objects using Temporal Logic and Tree Search," both of which are incorporated by reference in entirety and for all purposes.

Accordingly, in some cases, the techniques described herein enable determining a collision cost associated with a candidate trajectory. These techniques may be used by a planning component of a vehicle (e.g., an autonomous vehicle) to determine whether to adopt a candidate trajectory for controlling the vehicle and/or to determine whether to modify a candidate trajectory and use this modified trajectory for controlling the vehicle or otherwise implement safety mechanisms. Additionally or alternatively, the techniques described herein may enable a validation component that is configured to determine whether a candidate trajectory generated by another component (e.g., a planning component) is safe (e.g., is collision-proof). For example, the validation component may use the techniques described herein to determine whether to adopt a candidate trajectory for controlling the vehicle and/or to determine whether to modify a candidate trajectory and use this modified trajectory for controlling the vehicle. The techniques described herein may enable determining a cost associated with a trajectory based on whether the trajectory is predicted to collide with an object in a vehicle environment.

In some cases, the techniques described herein may be implemented in the context of a vehicle including a primary system for generating data to control the vehicle and a secondary system that validates the data and/or other data to avoid collisions. For example, the primary system may localize the vehicle, detect an object around the vehicle, segment sensor data, determine a classification of the object, predict an object trajectory, generate a trajectory for the vehicle, and so on. The secondary system may independently localize the vehicle, detect an object around the vehicle, predict an object trajectory, evaluate a trajectory generated by the primary system, and so on. In examples, the secondary system may also monitor components of the vehicle to detect an error. If the secondary system detects an error with a trajectory generated by the primary system and/or an error with a component of the vehicle, the secondary system may cause the vehicle to perform a maneuver, such as decelerating, changing lanes, swerving, etc. In examples, the secondary system may send information to the primary system (e.g., information regarding a potential collision). In many examples, the techniques discussed herein may be implemented to avoid a potential collision with an object around the vehicle. Of course, though described herein as a primary and secondary system, the techniques described may be implemented in any number of systems and subsystems in order to verify controls, provide high integrity algorithms, and redundant processes for safe control.

The primary system may generally perform processing to control how the vehicle maneuvers within an environment. The primary system may implement various Artificial Intelligence (AI) techniques, such as machine learning, to understand an environment around the vehicle and/or instruct the vehicle to move within the environment. For example, the primary system may implement the AI techniques to localize the vehicle, detect an object around the vehicle, segment sensor data, determine a classification of the object, determine an object track, generate a trajectory for the vehicle, and so on. In one example, the primary system generates a primary trajectory for controlling the vehicle and a secondary, contingent trajectory for controlling the vehicle, and provides the primary trajectory and the secondary trajectory to the secondary system. The contingent trajectory may control the vehicle to come to a stop and/or to perform another maneuver (e.g., lane change, etc.).

The secondary system may generally evaluate the primary system using at least a subset of data (e.g., sensor data) made available to the primary system. The secondary system may use similar techniques as used in the primary system to verify outputs of the primary system and/or use dissimilar techniques to ensure consistency and verifiability of such outputs. In examples, the secondary system may include a localizer to independently localize the vehicle by determining a position and/or orientation (together a pose) of the vehicle relative to a point and/or object in an environment where the vehicle is located. The secondary system may also include a perceiver to detect an object around the vehicle, determine a track for the object, predict a trajectory for the object, and so on. The secondary system may include a monitor component to monitor one or more components of the vehicle to detect an error with the one or more components. Further, the secondary system may include a trajectory manager to use data from the localization component, the perceiver, and/or the monitor component of the secondary system to evaluate a trajectory of the vehicle provided by the primary system and/or determine a trajectory to use to control the vehicle. The secondary system may also include a drive manager (and/or a system controller(s)) to receive a trajectory from the trajectory manager and control the vehicle based on the trajectory. Exemplary operations of the secondary system are described in US Patent Application Publication No. 20200211394, entitled "Collision Avoidance System," which is incorporated by reference herein in its entirety and for all purposes.

In some cases, the techniques and/or systems discussed herein may enhance the safety of passengers in a vehicle and/or other individuals in proximity to the vehicle. For example, a second component may detect a triggering event associated with a trajectory provided by a first component and control a vehicle to safely decelerate, stop, and/or perform another maneuver to avoid a collision. In some cases, the second component may operate relatively independently from the first component, so that another form of evaluation occurs to avoid a collision. For example, the second component may independently detect an object in proximity to the vehicle and/or evaluate a trajectory generated by the first component. Further, in some cases, the second component may be a higher integrity (e.g., more verifiable) and/or less complex system than the first component. For example, the second component may be designed to process less data, include a shorter processing pipeline than the first component, operate according to techniques that are more easily verifiable than the techniques of the first component, and so on.

In some cases, the techniques described herein increase the redundancy of a vehicle computing device by equipping the device with two components for trajectory validation. In some cases, if one of those components fails, the other can take over, which increases the reliability of the vehicle computing device. This redundancy approach provides an additional layer of safety and continuity in the trajectory validation process. If a safety condition is detected or if a trajectory needs to be verified, both trajectory validation components work in parallel to independently assess and validate the trajectory. This simultaneous validation process increases the system's confidence in the accuracy and reliability of the trajectory, as any discrepancies or inconsistencies between the two components can be detected and resolved. Moreover, in the event of a failure in one of the components, the remaining component can continue performing trajectory validation without interruption, ensuring the vehicle's operations remain secure and unaffected by the failure.

The methods, apparatuses, and systems described herein may be implemented in a number of ways. Example implementations are provided below with reference to the following figures. Although discussed in the context of an autonomous vehicle, in some examples, the methods, apparatuses, and systems described herein may be applied to a variety of systems. In another example, the methods, apparatuses, and systems may be utilized in an aviation or nautical context. Additionally, or alternatively, the techniques described herein may be used with real data (e.g., captured using sensor(s)), simulated data (e.g., generated by a simulator), or any combination thereof.

FIG. 1 depicts an example architecture 100 for performing at least some of the techniques described herein. As depicted in FIG. 1, the architecture includes a vehicle 104 with sensor(s) 118 and the computing device(s) 116. As further depicted in FIG. 1, the vehicle 104 is in an environment 102 with an object 106. While the example object depicted in FIG. 1 is another vehicle, a person of ordinary skill in the relevant technology will recognize that the object may be a non-vehicular object, including a non-vehicular dynamic object such as a pedestrian.

According to the techniques discussed herein, data gathered by the vehicle 104 may include sensor data from sensor(s) 118 of the vehicle 104. For example, the sensor(s) 118 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.). The sensor(s) 118 may generate sensor data, which may be received by computing device(s) 116 associated with the vehicle 104. However, in other examples, some or all of the sensor(s) 118 and/or computing device(s) 116 may be separate from and/or disposed remotely from the vehicle 104 and data capture, processing, commands, and/or controls may be communicated to/from the vehicle 104 by one or more remote computing devices via wired and/or wireless networks.

As depicted in FIG. 1, the computing device(s) may perform operations associated with the routine 120. The routine 120 may be configured to determine whether the candidate trajectory 108 collides with the object 106. The routine 120 may further include determining whether to modify the candidate trajectory 108 and determining to control the vehicle 104 based on the modified trajectory. The candidate trajectory 108 may, for example, be determined by a planning component of the computing device(s) 116 of the vehicle 104.

As further depicted in FIG. 1, the routine 120 includes determining, based on a current vehicle position 104(1) and the candidate trajectory 108, that the vehicle 104 will be at the predicted vehicle position 104(2) at the tth time. The predicted vehicle position 104(B) may be the vehicle position associated with the tth time as represented by the candidate trajectory 108 (e.g., the vehicle position at the tth if the vehicle follows the candidate trajectory 108).

The routine 120 may further include determining, based on the current object position 106(1) and a set of predicted object trajectories, that the object will be at one of the predicted object position 106(A), the predicted object position 106(B), or predicted object position 106(C) at the tth time. The set of predicted object trajectories includes trajectory 110(A), trajectory 110(B), and trajectory 110(C). The predicted object position 106(A) may be a predicted object position determined based on (e.g., computed assuming that the object 106 follows) the predicted object position 106(A). The predicted object position 106(B) may be a predicted object position determined based on (e.g., computed assuming that the object 106 follows) the predicted object position 106(B). The predicted object position 106(C) may be a predicted object position determined based on (e.g., computed assuming that the object 106 follows) the predicted object position 106(C).

In some cases, example system may determine a predicted object position by combining (e.g., averaging, determining a weighted average of, and/or the like) the predicted object positions represented by the set of predicted object trajectories (e.g., by combining a predicted object trajectory associated with the tth time as represented by trajectory 110(A), a predicted object trajectory associated with the tth time as represented by trajectory 110(B), and a predicted object trajectory associated with the tth time as represented by trajectory 110(C)).

The routine 120 may further include determining a vehicle position distribution 112 based on the predicted vehicle position 104(B). The vehicle position distribution 112 may represent an uncertainty about the position of the vehicle 104 at the tth time. The uncertainty associated with the vehicle position may be based on uncertainties about accuracy of vehicle's pose measurement and/or uncertainties associated with how the vehicle is controlled (e.g., whether environmental conditions and/or mechanical limitations hinder controlling the vehicle based on a planned trajectory). The mean of the vehicle position distribution 112 may be determined based on the predicted vehicle position 104(B). The covariance measure (e.g., the covariance matrix) of the vehicle position distribution 112 may be determined based on a measure of uncertainty associated with the position of the vehicle 104 at the tth time.

The routine 120 may further include determining an object position distribution 114(B) based on the predicted object position 106(B). The object position distribution 114(B) may represent an uncertainty about the position of the object 106 at the tth time if the object 106 moves based on the trajectory 110(B). The uncertainty associated with the object position may be based on an error associated with a model (e.g., a machine learning model) used to detect and/or predict a trajectory of the object.

The mean of the object position distribution 114(B) may be determined based on the predicted object position 106 (B). The covariance measure (e.g., the covariance matrix) of the object position distribution 114(B) may be determined based on a measure of uncertainty associated with the position of the object 106 at the tth time if the object 106 moves based on the trajectory 110(B). Similarly, the routine 120 may include determining an object position distribution 114(A) based on the predicted object position 106(A) and/or determining an object position distribution 114(C) based on the predicted object position 106(C). The object position distribution 114(A) may represent an uncertainty about the position of the object 106 at the tth time if the object 106 moves based on the trajectory 110(A). The object position distribution 114(C) may represent an uncertainty about the position of the object 106 at the tth time if the object 106 moves based on the trajectory 110(C). The mean of the object position distribution 114(A) may be determined based on the predicted object position 106(A). The covariance measure (e.g., the covariance matrix) of the object position distribution 114(A) may be determined based on a measure of uncertainty associated with the position of the object 106 at the tth time if the object 106 moves based on the trajectory 110(A). The mean of the object position distribution 114(C) may be determined based on the predicted object position 106(C). The covariance measure (e.g., the covariance matrix) of the object position distribution 114(C) may be determined based on a measure of uncertainty associated with the position of the object 106 at the tth time if the object 106 moves based on the trajectory 110(C).

The routine 120 may further include determining, based on the predicted vehicle position 104(B) and the predicted object position 106(B), a collision probability associated with the tth time. The collision probability may represent a likelihood that the vehicle 104 will collide with the object 106 at the tth time if the vehicle 104 follows the candidate trajectory 108. In some cases, the collision probability may be determined using a relative position distribution determined based on: (i) the vehicle position distribution 112 as determined based on the predicted vehicle position 104(B), and (ii) the object position distribution 114(B) as determined based on the predicted object position 106(B).

For example, the routine 120 may include determining the collision probability associated with the tth time based on: (i) determining a directional relative position distribution based on the relative position distribution, and (ii) evaluating the CDF of the directional relative position distribution at a value associated with a distance between the predicted vehicle position 104(B) and the predicted object position 106(B). Example techniques for determining the relative position distribution and using the relative position distribution to determine a collision probability associated with a time are described above as well as below with reference to FIGS. 2-3.

The routine 120 may further include determining a cost associated with the candidate trajectory 108 based on a collision probability and a predicted collision severity associated with the tth time. The predicted collision severity may represent the expected severity of a collision at the tth time as determined based on the state of the environment at the tth time. Example techniques for determining a predicted collision severity and using the predicted collision severity to determine a collision cost associated with a candidate vehicle trajectory are described above as well as below with reference to FIGS. 4-5.

The routine 120 may further include determining whether to adopt the candidate trajectory 108 based on the determined cost. For example, the routine 120 may include adopting the candidate trajectory 108 if the candidate trajectory 108 has the lowest cost among a set of candidate trajectories. As another example, the routine 120 may include adopting the candidate trajectory 108 if the cost associated with the candidate trajectory 108 falls below a threshold.

Figure 2:
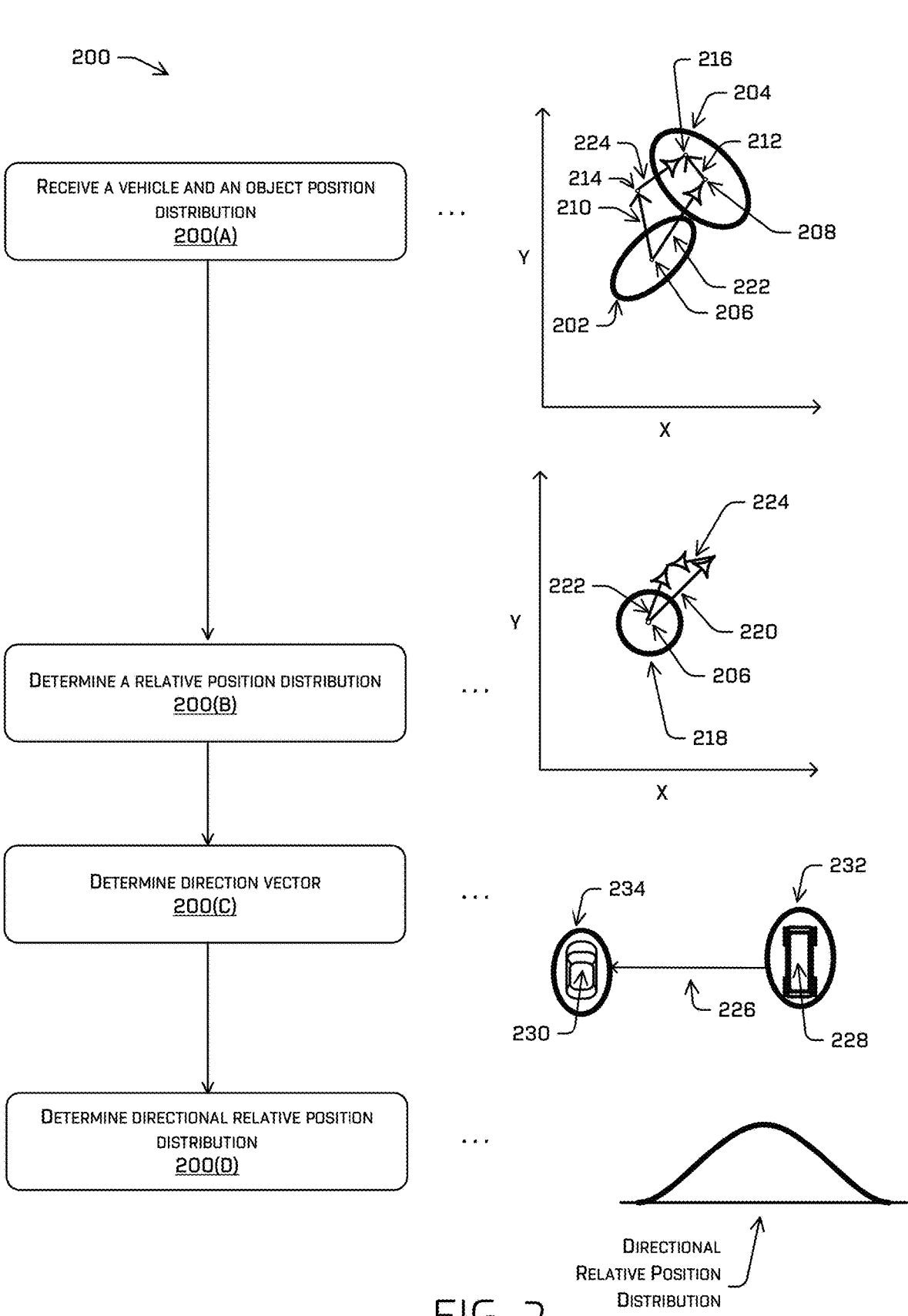
FIG. 2 provides a flowchart diagram of an example process for determining a directional relative position distribution.

FIG. 2 provides a flowchart diagram of an example process 200 for determining a directional relative position distribution associated with a tth time. As depicted in FIG. 2, at operation 200(A), an example system includes receiving a vehicle position distribution and an object position distribution. The vehicle position distribution may represent an uncertainty about a position of a vehicle at the tth time, while the object position distribution may represent an uncertainty about a position of an object at the tth time.

In some cases, both the vehicle position distribution and the object position distribution are Gaussian distributions, such as two-dimensional Gaussian distributions. For example, as depicted in FIG. 2, the system determines the vehicle position distribution 202 and the object position distribution 204, both of which are two-dimensional Gaussian distributions. The vehicle position distribution 202 and the object position distribution 204 may both be associated with a time T1. As depicted in FIG. 2, the vehicle position distribution 202 may be associated with a mean determined based on the determined vehicle position 206 at time T1. The object position distribution 204 may be associated with a mean determined based on the determined object position 208 at time T1.

As further depicted in FIG. 2, the vehicle trajectory being evaluated is expected to cause the vehicle to move based on the trajectory 210. This may cause the vehicle to move, from time T1 to time T2, from the vehicle position 206 to the vehicle position 214. Furthermore, the predicted object trajectory being evaluated is expected to cause the object to move based on the trajectory 212. This may cause the object to move, from time T1 to time T2, from the object position 208 to the object position 216.

At operation 200(B), the system determines a relative position distribution based on the object position distribution and the vehicle position distribution. Example techniques for determining the relative position distribution are described below. In some cases, the relative position distribution is a two-dimensional Gaussian distribution.

The relative position distribution may represent a relationship between the object position distribution and the vehicle position distribution. For example, as depicted in FIG. 2, the relative position distribution 218 may represent a relationship between the vehicle position distribution 202 and the object position distribution 204.

The relevant position distribution may be centered at one of the predicted vehicle position or the predicted object position. For example, as depicted in FIG. 2, the relative position distribution 218 is centered at the predicted vehicle position 206. The relative position distribution 218 may move in a direction determined based on the relevant position of the predicted vehicle position and the predicted object position at one time and the relative position of the predicted vehicle position and the predicted object position at another (e.g., a subsequent) time. For example, as depicted in FIG. 2, the vector 224 represents a movement of the relative position distribution from time T1 to time T2. The vector 224 may be determined based on (e.g., based on a summation of) the vector 220 and the vector 222. The vector 220 may be determined based on (e.g., may be a vector that includes) the predicted vehicle position 206 at time T1 and the predicted object position 208 at time T1, and/or may represent a relative position of the object with respect to the vehicle at time T1. The vector 224 may be determined based on (e.g., may be a vector that includes) the predicted vehicle position 214 at time T2 and the predicted object position 216 at time T2, and/or may represent a relative position of the object with respect to the vehicle at time T2.

At operation 200(C), the system determines a direction vector. The direction vector may represent a vector associated with a predicted vehicle position and a predicted object position at the tth time. The predicted vehicle position may, for example, be the mean of the vehicle position distribution, while the predicted object position may be the mean of the object position distribution.

In some cases, the system determines a vehicle region based on determining a geometric shape, such as a capsule, around the predicted vehicle position. In some cases, the system determines an object region based on determining a geometric shape, such as a capsule, around the predicted object position. In some cases, the direction vector may be a vector that is associated with (e.g., intersects with) a closest point in the vehicle region to the object region and a closest point in the object region to the vehicle region.

For example, as depicted in FIG. 2, the system performs the following operations to determine the direction vector 226: (i) determining a vehicle region 232 based on the predicted vehicle position 228, (ii) determining an object region 234 based on the predicted object position 230, and (iii) determining the direction vector 226 based on the closest point of the vehicle region 232 to the object region 234 and the closest point of the object region 234 to the vehicle region 232.

At operation 200(D), the system determines a directional relative position distribution. The directional relative position distribution may represent a relationship between the predicted vehicle position and the predicted object position along a particular vector, such as the direction vector. The directional relative position distribution may be determined by projecting the relative position distribution along a vector, such as the direction vector. For example, in some cases, the system may determine the relative position distribution based on a variance of the relative position distribution along a vector, such as the direction vector.

In some cases, the directional relative position distribution may be a one-dimensional representation, such as a one-dimensional Gaussian distribution. For example, as depicted in FIG. 2, the directional relative position distribution 236 is a one-dimensional Gaussian distribution. In some cases, the directional relative position distribution 236 is determined based on the direction vector 226 (e.g., by projecting the relative position distribution 218 into one dimension based on the direction vector 226, by determining a variance of the relative position distribution 218 based on the direction vector 226, and/or the like).

Figure 3:
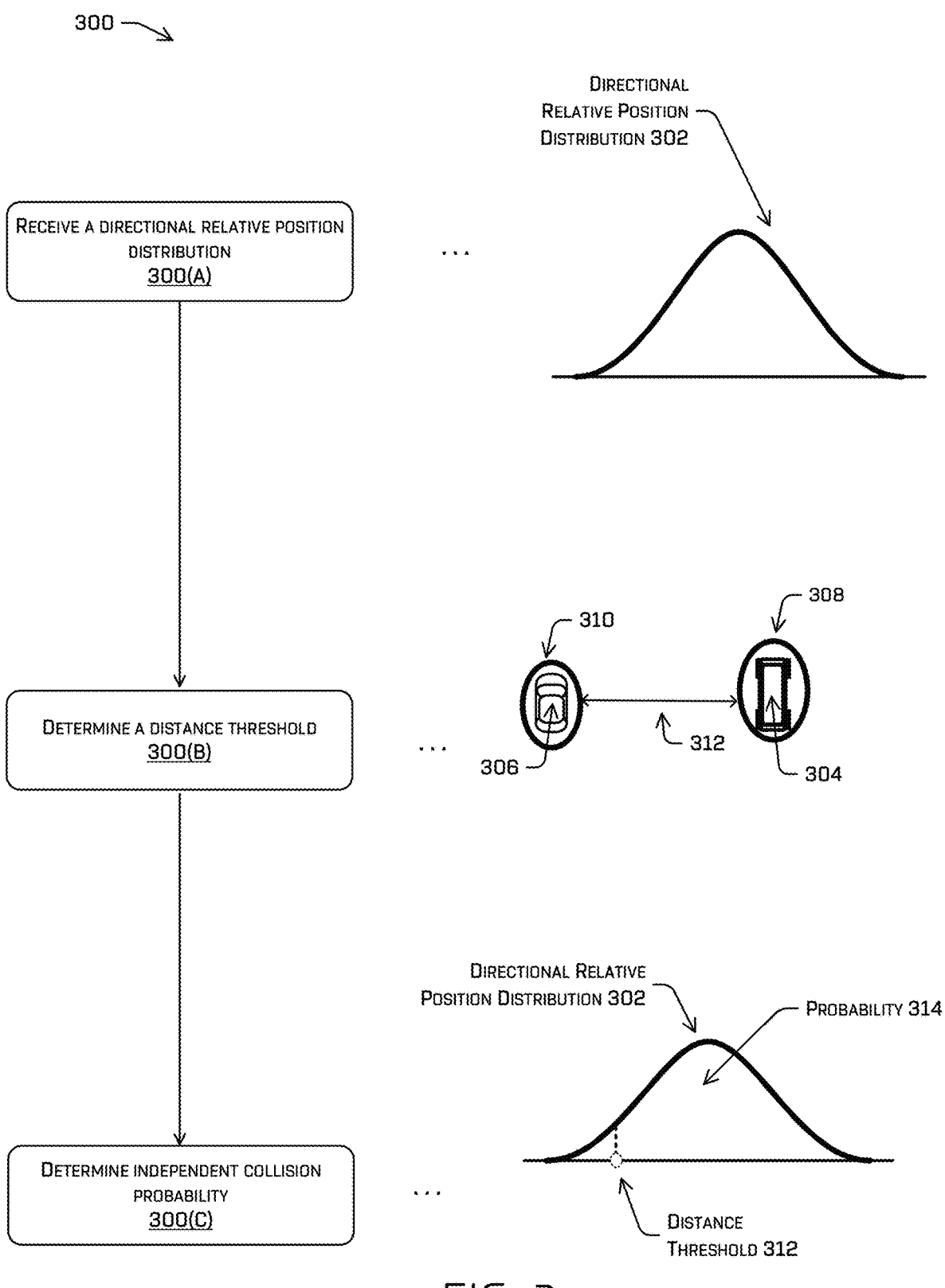
FIG. 3 provides a flowchart diagram of an example process for determining an independent collision probability based on a directional relative position distribution.

FIG. 3 provides a flowchart diagram of an example process 300 for determining an independent collision probability associated with a tth time based on a directional relative position distribution associated with that time. As depicted in FIG. 3, at operation 300(A), an example system receives a directional relative position distribution. The directional relative position distribution may be a one-dimensional Gaussian distribution, such as the directional relative position distribution 302 that is depicted in FIG. 1.

At operation 300(B), the system determines a distance threshold associated with the tth time. The distance threshold may be determined based on a position associated with a vehicle and a position associated with an object at the tth time. For example, the system may determine the distance threshold based on a closest point in a vehicle region that includes the vehicle position to an object region that includes the object region as well as a closest point in the object region to the vehicle region.

For example, as depicted in FIG. 3, the distance threshold 312 is determined based on a distance between a closest point of the vehicle region 308 to the object region 310 and a closest point of the object region 310 to the vehicle region 308. The vehicle region 308 may include a region including the vehicle position 304, such as a capsule centered at the vehicle position 304. The object region 310 may include a region including the object position 306, such as a capsule centered at the object position 306. The vehicle position 304 may be the mean of the vehicle position distribution associated with the tth time, while the object position 306 may be the mean of the object position distribution associated with the tth time.

At operation 300(C), the system determines an independent collision probability associated with the tth time based on the directional relative position distribution and the distance threshold. In some cases, the system determines the independent collision probability based on a cumulative probability resulting from the output of evaluating the CDF of the directional relative position distribution with respect to the distance threshold. In some cases, the system may determine the independent collision probability based on one minus the output of evaluating the CDF of the directional relative position distribution with respect to the distance threshold.

For example, as depicted in FIG. 1, the independent collision probability 314 is determined based on a region of the area under the curve associated with the directional relative position distribution 302 that is to the right to the distance threshold 312. Accordingly, in some cases, as the distance threshold 312 increases (e.g., as the vehicles get farther away from each other), the independent collision probability decreases.

FIG. 4 is a flowchart diagram of an example process 400 for controlling a vehicle based on a determined collision cost associated with a candidate trajectory. As depicted in FIG. 4, at operation 402, an example system determines a $(t-1)$th independent collision probability $(g(\theta_{t-1}))$. The $(t-1)$th independent collision probability may be a collision probability determined based on a state of the environment associated with the $(t-1)$th time, for example based on a predicted vehicle position and/or a predicted object position at the $(t-1)$th time.

Example techniques for determining an independent collision probability associated with a time are described above. For example, in some cases, the system may determine a vehicle position distribution associated with the $(t-1)$th time based on an uncertainty about a predicted vehicle position at the $(t-1)$th given a candidate trajectory being evaluated. The system may also determine an object position distribution associated with the $(t-1)$th time based on one or more predicted object trajectories associated with an object. The system may then determine a relative position distribution associated with the $(t-1)$th time based on the vehicle position distribution and the object position distribution associated with the $(t-1)$th time (e.g., using the techniques described above for determining a relative position distribution for a time based on the vehicle position distribution and the object position distribution associated with that time). The system may then determine a directional vector and/or a distance threshold associated with the $(t-1)$th time based on a position associated with the vehicle at the $(t-1)$th time and a position associated with the object at the $(t-1)$th time (e.g., using the techniques described above for determining a directional vector and/or a distance threshold). The system may then determine a directional relative position distribution by projecting the relative position distribution into one dimension based on the directional vector (e.g., using the techniques described above for projecting a relative position distribution into one dimension based on a directional vector). The system may then determine the independent collision probability associated with the $(t-1)$th time based on the output of evaluating the CDF of the directional relative position distribution based on the distance threshold.

At operation 404, the system determines a th independent collision probability $(g(\theta_t))$. The tth independent collision probability may be a collision probability determined based on a state of the environment associated with the tth time, for example based on a predicted vehicle position and/or a predicted object position at the tth time. Example techniques for determining an independent collision probability associated with a time are described above.

At operation 406, the system determines a collision start probability associated with the tth time $(p(c_t|n_{t-1}))$ based on the $(t-1)$th independent collision probability $(g(\theta_{t-1}))$ and the tth independent collision probability $(g(\theta_t))$. The collision start probability associated with the tth time may represent a likelihood that a collision first starts at the tth time. The collision start probability associated with the tth time may represent a likelihood that the tth time is associated with a collision while the $(t-1)$th is not. In some cases, the system may determine the collision start probability associated with the tth time based on a ratio associated with the $(t-1)$th independent collision probability and the tth independent collision probability $(g(\theta_t))$. In some cases, the system may determine the collision start probability associated with the tth time based on $$\frac{g(\theta_t - \theta_{t-1})}{1 - \theta_{t-1}}.$$

For example, the system may determine the collision start probability associated with a th time based on $$p(c_t|n_{t-1}) = \max\left\{0, \frac{g(\theta_t - \theta_{t-1})}{1 - \theta_{t-1}}\right\}.$$

At operation 408, the system determines a collision probability associated with the tth time $(p(c_t))$ based on the collision start probability associated with the tth time $(p(c_t|n_{t-1}))$. In some cases, the system determines collision probability associated with the tth time based on collision start probability associated with the tth time and a collision probability associated with the $(t-1)$th time $(p(c_{t-1}))$. For example, the system may determine collision probability associated with the tth time based on $p(c_t)=p(c_t|n_{t-1})$ $(1-p(c_{t-1}))+p(c_{t-1})$.

At operation 410, the system determines a severity measure associated with the tth time $f(\theta_t)$. The severity measure may represent a prediction about how severe a collision occurring at the tth time may be based on a state of the environment associated with the tth time $(\theta_t)$, for example based on a detected and/or predicted environment state at the tth time. The environment state may represent a detected and/or predicted vehicle position and a detected and/or predicted object position associated with the tth time. In some cases, the environment state may represent a vehicle position distribution and an object position associated with the tth time. Example techniques for determining a severity measure are described above.

At operation 412, the system determines a collision cost associated with a candidate trajectory based on the collision start probability associated with the tth time ($p(c_t|n_{t-1})$) and the severity measure associated with the tth time $f(\theta_t)$. In some cases, the system combines (e.g., multiplies) the collision start probability associated with the tth time and the severity measure associated with the tth time to determine an incremental cost associated with that time. In some cases, the system determines the collision cost based on the output of combining (e.g., determining a summation of) the incremental costs associated with each of a sequence of T times. For example, the system may determine the collision cost based on $$\sum_{t=0}^{T} f(\theta_t)(p(c_t) - p(c_{t-1})).$$

In some cases, given two or more objects, the system determines a collision cost for each of the objects, and then determines a total collision cost based on a combination of the object-specific costs.

At operation 414, the system determines a trajectory for the vehicle based on the collision cost. For example, the system may determine whether to adopt or reject the candidate trajectory based on a cost associated with the trajectory. In some cases, the cost determined at operation 412 may be determined based on a process configured to determine a trajectory for the vehicle, for example using one or more tree-based trajectory determination techniques and/or one or more trajectory determination techniques using stochastic optimization.

At operation 416, the system controls the vehicle based on the determined trajectory. The system may control the vehicle by determining one or more movements of the vehicle based on the determined trajectory.

FIG. 5 is a flowchart diagram of an example process 500 for determining a severity measure associated with a tth time based on an environment state associated with that time. As depicted in FIG. 5, at operation 502, the system determines vehicle velocity data associated with a vehicle. The vehicle velocity data may represent a direction and/or speed of the vehicle's movement at the tth time. In some cases, the vehicle velocity data represent a predicted velocity of the vehicle at the tth time.

At operation 504, the system receives a relative position vector associated with the tth time. Example techniques for determining the relative position vector associated with a time are described above.

At operation 506, the system determines object velocity data associated with an object. The object velocity data may represent a direction and/or speed of the object's movement at the tth time. In some cases, the object velocity data represent a predicted velocity of the object at the tth time.

At operation 508, the system determines a first directional velocity based on the vehicle velocity data and the relative position vector. The first directional velocity may represent a speed of the vehicle in the direction associated with the relative position vector.

At operation 510, the system determines a second directional velocity based on the object velocity data and the relative position vector. The first directional velocity may represent a speed of the object in the direction associated with the relative position vector.

At operation 512, the system receives a first mass associated with the vehicle and a second mass associated with the object. In some cases, the first mass and/or the second mass may be the measured and/or detected mass of the vehicle and/or the object, respectively. In some cases, the first mass and/or the second mass may be determined based on a classification associated with the vehicle and/or the object, respectively. For example, based on determining that the vehicle and/or the object is a sedan vehicle, the system may assign a weight (e.g., an average sedan vehicle weight) to the vehicle and/or the object.

At operation 514, the system determines the severity measure based on the first directional velocity, the second directional velocity, the first mass, and the second mass. Example techniques for determining a severity measure based on a component of the vehicle's velocity in a specific direction, a component of the object's velocity in the specific direction, a mass associated with the vehicle, and a mass associated with the object are described above.

Figure 6:
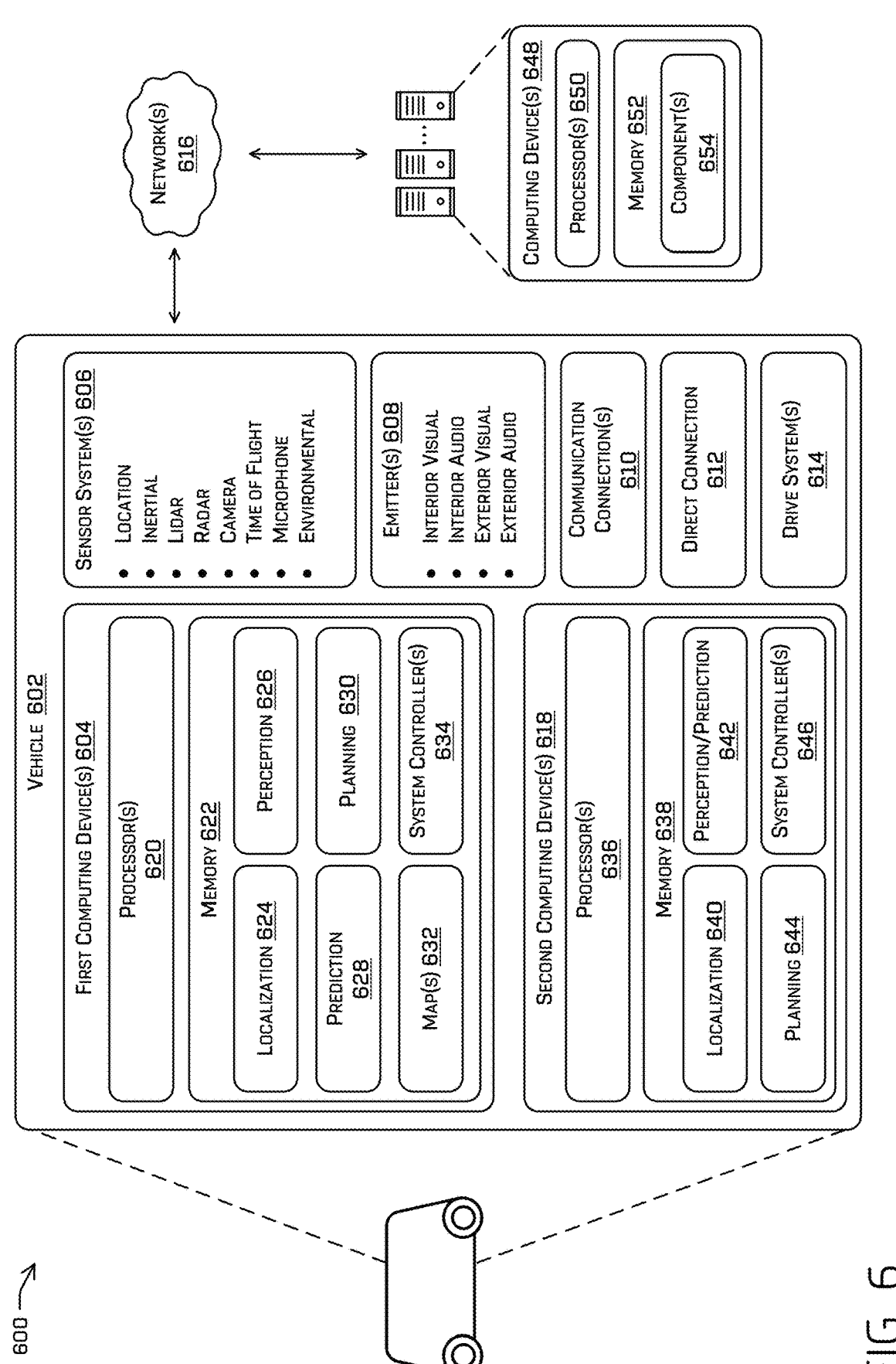
FIG. 6 is a block diagram of an example system for implementing the techniques described herein.

FIG. 6 is a block diagram of an example system 600 for implementing the techniques described herein. In at least one example, the system 600 can include a vehicle 602. In the illustrated example system 600, the vehicle 602 is an autonomous vehicle; however, the vehicle 602 can be any other type of vehicle.

The vehicle 602 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 602 can be configured to control all functions from start to completion of the trip, including all parking functions, it may not include a driver and/or controls for driving the vehicle 602, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 602 can include one or more first computing devices 604, one or more sensor system(s) 606, one or more emitters 608, one or more communication connections 610 (also referred to as communication devices and/or modems), at least one direct connection 612 (e.g., for physically coupling with the vehicle 602 to exchange data and/or to provide power), and one or more drive systems 614. The one or more sensor system(s) 606 can be configured to capture sensor data associated with an environment.

The sensor system(s) 606 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 606 can include multiple instances of each of these or other types of sensors. For example, the time-of-flight sensors can include individual time-of-flight sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the first computing device(s) 604.

The vehicle 602 can also include emitter(s) 608 for emitting light and/or sound. The emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 602 can also include communication connection(s) 610 that enable communication between the vehicle 602 and one or more other local or remote computing device(s) (e.g., a remote teleoperation computing device) or remote services. For example, the communication connection(s) 610 can facilitate communication with other local computing device(s) on the vehicle 602 and/or the drive system(s) 614. Also, the communication connection(s) 610 can allow the vehicle 602 to communicate with other nearby computing device(s) (e.g., other nearby vehicles, traffic signals, etc.).

The communications connection(s) 610 can include physical and/or logical interfaces for connecting the first computing device(s) 604 to another computing device or one or more external networks 616 (e.g., the Internet). For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 602 can include drive system(s) 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include the sensor system(s) 606 to detect conditions of the drive system(s) 614 and/or the surroundings of the vehicle 602. By way of example and not limitation, the sensor system(s) 606 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) 606 on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) 606 and to control operation of the various vehicle systems. In some examples, the drive system controller can include one or more processor(s) and memory communicatively coupled with the one or more processor(s). The memory can store one or more components to perform various functionalities of the drive system(s) 614. Furthermore, the drive system(s) 614 also include one or more communication connection(s) that enable communication by the respective drive system with one or more other local or remote computing device(s).

The vehicle 602 can include one or more second computing devices 618 to provide redundancy, error checking, and/or validation of determinations and/or commands determined by the first computing device(s) 604.

By way of example, the first computing device(s) 604 may be considered to be a primary system, while the second computing device(s) 618 may be considered to be a secondary system. The primary system may generally perform processing to control how the vehicle maneuvers within an environment. The primary system may implement various Artificial Intelligence (AI) techniques, such as machine learning, to understand an environment around the vehicle and/or instruct the vehicle to move within the environment. For example, the primary system may implement the AI techniques to localize the vehicle, detect an object around the vehicle, segment sensor data, determine a classification of the object, predict an object track, generate a trajectory for the vehicle, and so on. In examples, the primary system processes data from multiple types of sensors on the vehicle, such as light detection and ranging (lidar) sensors, radar sensors, image sensors, depth sensors (time of flight, structured light, etc.), and the like.

The secondary system may validate an operation of the primary system and may take over control of the vehicle from the primary system when there is a problem with the primary system. The secondary system may implement probabilistic techniques that are based on positioning, velocity, acceleration, etc. of the vehicle and/or objects around the vehicle. For example, the secondary system may implement one or more probabilistic techniques to independently localize the vehicle (e.g., to a local environment), detect an object around the vehicle, segment sensor data, identify a classification of the object, predict an object track, generate a trajectory for the vehicle, and so on. In examples, the secondary system processes data from a few sensors, such as a subset of sensor data that is processed by the primary system. To illustrate, the primary system may process lidar data, radar data, image data, depth data, etc., while the secondary system may process just lidar data and/or radar data (and/or time of flight data). In other examples, however, the secondary system may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference.

The first computing device(s) 604 can include one or more processors 620 and memory 622 communicatively coupled with the one or more processors 620. In the illustrated example, the memory 622 of the first computing device(s) 604 stores a localization component 624, a perception component 626, a prediction component 628, a planning component 630, one or more maps 632, and one or more system controllers 634. Though depicted as residing in the memory 622 for illustrative purposes, it is contemplated that the localization component 624, the perception component 626, the prediction component 628, the planning component 630, the maps 632, and the one or more system controllers 634 can additionally, or alternatively, be accessible to the first computing device(s) 604 (e.g., stored in a different component of vehicle 602 and/or be accessible to the vehicle 602 (e.g., stored remotely).

In memory 622 of the first computing device 604, the localization component 624 can include functionality to receive data from the sensor system(s) 606 to determine a position of the vehicle 602. For example, the localization component 624 can include and/or request/receive a three-dimensional map of an environment (and/or a map based on semantic objects) and can continuously determine a location of the autonomous vehicle within the map. In some instances, the localization component 624 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 624 can provide data to various components of the vehicle 602 to determine an initial position of an autonomous vehicle for generating a trajectory, as discussed herein.

The perception component 626 can include functionality to perform object detection, segmentation, and/or classification. In some examples, the perception component 626 can provide processed sensor data that indicates a presence of an entity that is proximate to the vehicle 602 and/or a classification of the entity as an entity type (e.g., car, pedestrian, cyclist, building, tree, road surface, curb, sidewalk, unknown, etc.). In additional or alternative examples, the perception component 626 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 626 can use perception algorithms to determine a perception-based bounding box associated with an object in the environment based on sensor data. For example, the perception component 626 can receive image data and classify the image data to determine that an object is represented in the image data. Then, using detection algorithms, the perception component 626 can generate a two-dimensional bounding box and/or a perception-based three-dimensional bounding box associated with the object. The perception component 626 can further generate a three-dimensional bounding box associated with the object. As discussed above, the three-dimensional bounding box can provide additional information such as a location, orientation, pose, and/or size (e.g., length, width, height, etc.) associated with the object.

The perception component 626 can include functionality to store perception data generated by the perception component 626. In some instances, the perception component 626 can determine a track corresponding to an object that has been classified as an object type. For purposes of illustration only, the perception component 626, using sensor system(s) 606 can capture one or more images of an environment. The sensor system(s) 606 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle 602. Fused perception data can include a fusion or other combination of sensor data from sensor system(s) 606, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 628 can generate one or more probability maps representing prediction probabilities of possible locations of one or more objects in an environment. For example, the prediction component 628 can generate one or more probability maps for vehicles, pedestrians, animals, and the like within a threshold distance from the vehicle 602. In some instances, the prediction component 628 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 630 can determine a path for the vehicle 602 to follow to traverse through an environment. For example, the planning component 630 can determine various routes and paths and various levels of detail. In some instances, the planning component 630 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 630 can generate instructions for guiding the autonomous vehicle along at least a portion of the route from the first location to the second location. In at least one example, the planning component 630 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 630 can alternatively, or additionally, use data from the perception component 626 and/or the prediction component 628 to determine a path for the vehicle 602 to follow to traverse through an environment. For example, the planning component 630 can receive data from the perception component 626 and/or the prediction component 628 regarding objects associated with an environment. Using this data, the planning component 630 can determine a route to travel from a first location (e.g., a current location) to a second location (e.g., a target location) to avoid objects in an environment. In at least some examples, such a planning component 630 may determine there is no such collision free path and, in turn, provide a path which brings vehicle 602 to a safe stop avoiding all collisions and/or otherwise mitigating damage.

The memory 622 can further include one or more maps 632 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 632 can include at least one map (e.g., images and/or a mesh). In some examples, the vehicle 602 can be controlled based at least in part on the map(s) 632. That is, the map(s) 632 can be used in connection with the localization component 624, the perception component 626, the prediction component 628, and/or the planning component 630 to determine a location of the vehicle 602, identify objects in an environment, generate prediction probabilit(ies) associated with objects and/or the vehicle 602, and/or generate routes and/or trajectories to navigate within an environment.

In some examples, the one or more maps 632 can be stored on a remote computing device(s) (such as the computing device(s) 648) accessible via network(s) 616. In some examples, multiple maps 632 can be stored based on, for example, a characteristic (e.g., type of entity, time of day, day of week, season of the year, etc.). Storing multiple maps 632 can have similar memory requirements but can increase the speed at which data in a map can be accessed.

In at least one example, the first computing device(s) 604 can include one or more system controller(s) 634, which can be configured to control steering, propulsion, braking, safety, emitters, communication, and other systems of the vehicle 602. These system controller(s) 634 can communicate with and/or control corresponding systems of the drive system(s) 614 and/or other components of the vehicle 602, which may be configured to operate in accordance with a path provided from the planning component 630.

The second computing device(s) 618 can comprise one or more processors 636 and memory 638 including components to verify and/or control aspects of the vehicle 602, as discussed herein. In at least one instance, the one or more processors 636 can be similar to the processor(s) 620 and the memory 638 can be similar to the memory 622. However, in some examples, the processor(s) 636 and the memory 638 may comprise different hardware than the processor(s) 620 and the memory 622 for additional redundancy.

In some examples, the memory 638 can comprise a localization component 640, a perception/prediction component 642, a planning component 644, and one or more system controllers 646.

In some examples, the localization component 640 may receive sensor data from the sensor system(s) 606 to determine one or more of a position and/or orientation (together a pose) of the autonomous vehicle 602. Here, the position and/or orientation may be relative to point(s) and/or object(s) in an environment in which the autonomous vehicle 602 is located. In examples, the orientation may include an indication of a yaw, roll, and/or pitch of the autonomous vehicle 602 relative to a reference plane and/or relative to point(s) and/or object(s). In examples, the localization component 640 may perform less processing than the localization component 624 of the first computing device(s) 604 (e.g., higher-level localization). For example, the localization component 640 may not determine a pose of the autonomous vehicle 602 relative to a map, but merely determine a pose of the autonomous vehicle 602 relative to objects and/or surfaces that are detected around the autonomous vehicle 602 (e.g., a local position and not a global position). Such a position and/or orientation may be determined, for example, using probabilistic filtering techniques, such as, for example, Bayesian filters (Kalman filters, extended Kalman filters, unscented Kalman filters, etc.) using some or all of the sensor data.

In some examples, the perception/prediction component 642 can include functionality to detect, identify, classify, and/or track object(s) represented in sensor data. For example, the perception/prediction component 642 can perform the clustering operations and operations to estimate or determine connectivity data associated with data points, as discussed herein.

In some examples, the perception/prediction component 642 may comprise an M-estimator, but may lack an object classifier such as, for example, a neural network, decision tree, and/or the like for classifying objects. In additional or alternate examples, the perception/prediction component 642 may comprise an ML model of any type, configured to disambiguate classifications of objects. By contrast, the perception component 626 may comprise a pipeline of hardware and/or software components, which may comprise one or more machine-learning models, Bayesian filters (e.g., Kalman filters), graphics processing unit(s) (GPU(s)), and/ or the like. In some examples, the perception data determined by the perception/prediction component 642 (and/or 626) may comprise object detections (e.g., identifications of sensor data associated with objects in an environment surrounding the autonomous vehicle), object classifications (e.g., identifications of an object type associated with detected objects), object tracks (e.g., historical, current, and/or predicted object position, velocity, acceleration, and/or heading), and/or the like.

The prediction component of the second computing device 618 may also process the input data to determine one or more predicted trajectories for an object. For example, based on a current position of an object and a velocity of the object over a period of a few seconds, the prediction component may predict a path that the object will move over the next few seconds. In some examples, such a predicted path may comprise using linear assumptions of motion given a position, orientation, velocity, and/or orientation. In other examples, such predicted paths may comprise more complex analyses.

In some examples, the planning component 644 can include functionality to receive a trajectory from the planning component 630 to validate that the trajectory is free of collisions and/or is within safety margins. In some examples, the planning component 644 can generate a safe stop trajectory (e.g., a trajectory to stop the vehicle 602 with a "comfortable" deacceleration (e.g., less than maximum deceleration)) and in some examples the planning component 644 can generate an emergency stop trajectory (e.g., maximum deceleration with or without steering inputs).

In some examples, the system controller(s) 646 can include functionality to control safety critical components (e.g., steering, braking, motors, etc.) of the vehicle. In this manner, the second computing device(s) 618 can provide redundancy and/or an additional hardware and software layer for vehicle safety.

The vehicle 602 can connect to computing device(s) 648 via the network 616 and can include one or more processors 650 and memory 652 communicatively coupled with the one or more processors 650. In at least one instance, the one or more processors 650 can be similar to the processor(s) 620 and the memory 652 can be similar to the memory 622. In the illustrated example, the memory 652 of the computing device(s) 648 stores a component(s) 654, which may correspond to any of the components discussed herein.

The processor(s) 620, 636, and/or 650 can be any suitable processor capable of executing instructions to process data and perform operations as described herein. By way of example and not limitation, the processor(s) 620, 636, and/or 650 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 622, 638, and/or 652 are examples of non-transitory computer-readable media. The memory 622, 638, and/or 652 can store an operating system and one or more software applications, instructions, programs, and/or data to implement the methods described herein and the functions attributed to the various systems. In various implementations, the memory 622, 638, and/or 652 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 622, 638, and/or 652 can be implemented as a neural network. In some examples, the components in the memory 622, 638, and/or 652 may not include machine learning algorithm to reduce complexity and to be verified and/or certified from a safety standpoint.

As described herein, an exemplary neural network is an algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

The various techniques described herein may be implemented in the context of computer-executable instructions or software, such as program modules, which are stored in computer-readable storage and executed by the processor(s) of one or more computing devices such as those illustrated in the figures. Generally, program modules include routines, programs, objects, components, data structures, etc., and define operating logic for performing particular tasks or implementing particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

A: A system comprising: one or more processors; and one or more non-transitory computer-readable media storing computer-executable instructions that, when executed, cause the system to perform operations comprising: receiving a first predicted position associated with a vehicle based at least in part on a trajectory; receiving a second predicted position associated with an object in an environment of the vehicle, wherein the first predicted position and the second predicted position are associated with a first time; determining a first probability distribution associated with the first predicted position and a second probability distribution associated with the second predicted position; determining, based at least in part on a relationship of the first probability distribution and the second probability distribution, a third probability distribution comprising a relative probability distribution between the vehicle and the object and centered on the first predicted position; determining, based at least in part on the third probability distribution and a distance, a first independent collision probability associated with the first time; determining, based at least in part on the first independent collision probability and a second independent collision probability associated with a second time, a collision start probability representing a probability of collision at the first time; determining a first collision probability associated with the first time based at least in part on the collision start probability and a second collision probability associated with the second time; determining a cost associated with the trajectory based at least in part on the first collision probability; and controlling the vehicle based at least in part on the cost.

B: The system of paragraph A, wherein determining the first independent collision probability comprises: determining a direction vector based at least in part on the first predicted position and the second predicted position; determining, based at least in part on the third probability distribution and the direction vector, a one-dimensional probability distribution; determining a cumulative probability associated with a distance based at least in part on the one-dimensional probability distribution; and determining the first independent collision probability based at least in part on the cumulative probability.

C: The system of paragraph A or B, wherein determining the cost further comprises: determining a direction based at least in part on the first predicted position and the second predicted position; determining a first velocity associated with the vehicle and the direction; determining a second velocity associated with the object and the direction; determining a severity measure associated with the first time based at least in part on the first velocity and the second velocity; and determining the cost based at least in part on the first collision probability and the severity measure.

D: The system of any of paragraphs A-C, the operations further comprising: determining a fourth probability distribution associated with a third predicted position of the object; determining, based at least in part on a relationship of the first probability distribution and the fourth probability distribution, a fifth probability distribution comprising a second relative probability distribution between vehicle and the object and centered on the first predicted position; determining, based at least in part on the fifth probability distribution and a second distance, a second cost associated with the first time; and controlling the vehicle based on the cost and the second cost.

E: The system of any of paragraphs A-D, wherein determining the collision start probability comprises: determining a first value based at least in part on the first independent collision probability and the second independent collision probability; and determining the collision start probability based at least in part on a greater of the first value and a minimum collision start probability.

F: One or more non-transitory computer-readable media storing instructions executable by one or more processors, wherein the instructions, when executed, cause the one or more processors to perform operations comprising: receiving a first predicted position associated with a vehicle and a first probability distribution associated with the first predicted position; receiving a second predicted position associated with an object and a second probability distribution associated with the second predicted position; determining, based at least in part on the first probability distribution and the second probability distribution, a relative probability distribution; determining a first independent collision probability based at least in part on the relative probability distribution and a distance from the first predicted position to a point on the object; and controlling the vehicle based at least in part on the first independent collision probability.

G: The one or more non-transitory computer-readable media of paragraph F, wherein determining the first independent collision probability comprises: determining the first independent collision probability based at least in part on a cumulative probability along a length of the distance.

H: The one or more non-transitory computer-readable media of paragraph F or G, wherein controlling the vehicle comprises: determining a cost associated with a trajectory based at least in part on the first independent collision probability and a severity measure; and controlling the vehicle based at least in part on the cost.

I: The one or more non-transitory computer-readable media of paragraph H, wherein determining the severity measure comprises: determining a first velocity associated with the vehicle and a direction, the direction being determined based at least in part on the first predicted position and the second predicted position; determining a second velocity associated with the object and the direction; and determining the severity measure based at least in part on the first velocity and the second velocity.

J: The one or more non-transitory computer-readable media of paragraph I, wherein the first predicted position and the second predicted position are associated with a first time, and wherein the operations further comprise: determining a first collision probability associated with a first time based on the first independent collision probability; determining a second collision probability associated with a second time; determining a cost based on the first collision probability and the second collision probability; and controlling the vehicle based on the cost.

K: The one or more non-transitory computer-readable media of any of paragraphs F-J, the operations further comprising: determining a first value based at least in part on the first independent collision probability; determining a collision start probability based at least in part on a greater of the first value and a minimum collision start probability; determining a cost based on the collision start probability; and controlling the vehicle based on the cost.

L: The one or more non-transitory computer-readable media of any of paragraphs F-K, the operations further comprising: determining a third probability distribution associated with a third predicted position of the object; determining a second relative probability distribution based on the first probability distribution and the third probability distribution; determining a first cost based on the relative probability distribution and a second cost based on the second relative probability distribution; and controlling the vehicle based on the first cost and the second cost.

M: The one or more non-transitory computer-readable media of any of paragraphs F-L, wherein at least one of the first probability distribution or the second probability distribution is a two-dimensional Gaussian probability distribution.

N: The one or more non-transitory computer-readable media of any of paragraphs F-M, the operations further comprising: determining, based on the first independent collision probability and a tree structure, a cost associated with a trajectory, the tree structure representing a set of available actions for the vehicle to take to traverse an environment; and controlling the vehicle based on the cost.

O: The one or more non-transitory computer-readable media of any of paragraphs F-N, the operations further comprising: determining a cost associated with the object based on the first independent collision probability; and controlling the vehicle based on the cost and a second cost associated with a second object.

P: A method comprising: receiving a first predicted position associated with a vehicle and a first probability distribution associated with the first predicted position; receiving a second predicted position associated with an object and a second probability distribution associated with the second predicted position; determining, based at least in part on the first probability distribution and the second probability distribution, a relative probability distribution; determining a first independent collision probability based at least in part on the relative probability distribution and a distance from the first predicted position to a point on the object; and controlling the vehicle based at least in part on the first independent collision probability.

Q: The method of paragraph P, wherein determining the first independent collision probability comprises: determining the first independent collision probability based at least in part on a cumulative probability along a length of the distance.

R: The method of paragraph P or Q, wherein controlling the vehicle comprises: determining a cost associated with a trajectory based at least in part on the first independent collision probability and a severity measure; and controlling the vehicle based at least in part on the cost.

S: The method of paragraph R, wherein determining the severity measure comprises: determining a first velocity associated with the vehicle and a direction, the direction being determined based at least in part on the first predicted position and the second predicted position; determining a second velocity associated with the object and the direction; and determining the severity measure based at least in part on the first velocity and the second velocity.

T: The method of any of paragraphs P-S, wherein the first predicted position and the second predicted position are associated with a first time, and the method further comprises: determining a first collision probability associated with a first time based on the first independent collision probability; determining a second collision probability associated with a second time; determining a cost based on the first collision probability and the second collision probability; and controlling the vehicle based on the cost.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:

one or more processors; and one or more non-transitory computer-readable media storing computer-executable instructions that, when executed, cause the system to perform operations comprising:

receiving a vehicle predicted position associated with a vehicle and based at least in part on a trajectory of the vehicle;

receiving an object predicted position associated with an object in an environment of the vehicle, wherein the first vehicle predicted position and the object predicted position are associated with a first time;

determining a first probability distribution associated with the vehicle predicted position and a second probability distribution associated with the object predicted position;

determining, based at least in part on a relationship of the first probability distribution and the second probability distribution, a relative position probability distribution associated with the vehicle and the object at the first time;

determining, based at least in part on the relative position probability distribution and a distance, a first independent collision probability associated with the first time;

determining, based at least in part on the first independent collision probability associated with the first time and a second independent collision probability associated with a second time, a collision start probability representing a probability of collision at the first time;

determining a first collision probability associated with the first time based at least in part on the collision start probability and a second collision probability associated with the second time;

determining a cost associated with the trajectory of the vehicle based at least in part on the first collision probability associated with the first time; and controlling the vehicle based at least in part on the cost associated with the trajectory of the vehicle.

2. The system of claim 1, wherein determining the first independent collision probability comprises:

determining a direction vector based at least in part on the vehicle predicted position and the object predicted position;

determining, based at least in part on the relative position probability distribution and the direction vector, a directional relative position probability distribution;

determining a cumulative probability associated with the distance based at least in part on the directional relative position probability distribution; and determining the first independent collision probability based at least in part on the cumulative probability associated with the distance.

3. The system of claim 1, wherein determining the cost associated with the trajectory of the vehicle further comprises:

determining a direction based at least in part on the vehicle predicted position and the object predicted position;

determining a first velocity associated with the vehicle and the direction;

determining a second velocity associated with the object and the direction;

determining a severity measure associated with the first time based at least in part on the first velocity and the second velocity; and determining the cost associated with the trajectory of the vehicle based at least in part on the first collision probability and the severity measure.

4. The system of claim 1, the operations further comprising:

determining a third probability distribution associated with a different object predicted position;

determining, based at least in part on a relationship of the first probability distribution and the third probability distribution, a second relative position probability distribution associated with the vehicle and the object;

determining, based at least in part on the second relative position probability distribution and a second distance, a second cost associated with the first time; and controlling the vehicle based on the cost and the second cost.

5. The system of claim 1, wherein determining the collision start probability comprises:

determining a first value based at least in part on the first independent collision probability and the second independent collision probability; and determining the collision start probability based at least in part on a greater of the first value and a minimum collision start probability.

6. One or more non-transitory computer-readable media storing instructions executable by one or more processors, wherein the instructions, when executed, cause the one or more processors to perform operations comprising:

receiving a vehicle predicted position associated with a vehicle and a first probability distribution associated with the vehicle predicted position;

receiving an object predicted position associated with an object and a second probability distribution associated with the object predicted position;

determining, based at least in part on the first probability distribution and the second probability distribution, a relative position probability distribution associated with the vehicle and the object;

determining a first independent collision probability based at least in part on the relative position probability distribution and a distance from the vehicle predicted position to a point on the object; and controlling the vehicle based at least in part on the first independent collision probability.

7. The one or more non-transitory computer-readable media of claim 6, wherein determining the first independent collision probability comprises:

determining the first independent collision probability based at least in part on a cumulative probability along a length of the distance from the vehicle predicted position to the point on the object.

8. The one or more non-transitory computer-readable media of claim 6, wherein controlling the vehicle comprises:

determining a cost associated with a trajectory based at least in part on the first independent collision probability and a severity measure; and controlling the vehicle based at least in part on the cost associated with the trajectory.

9. The one or more non-transitory computer-readable media of claim 8, wherein determining the severity measure comprises:

determining a first velocity associated with the vehicle and a direction, the direction being determined based at least in part on the vehicle predicted position and the object predicted position;

determining a second velocity associated with the object and the direction; and determining the severity measure based at least in part on the first velocity and the second velocity.

10. The one or more non-transitory computer-readable media of claim 9, wherein the vehicle predicted position and the object predicted position are associated with a first time, and wherein the operations further comprise:

determining a first collision probability associated with the first time based on the first independent collision probability;

determining a second collision probability associated with a second time;

determining the cost associated with the trajectory based on the first collision probability and the second collision probability; and controlling the vehicle based on the cost associated with the trajectory.

11. The one or more non-transitory computer-readable media of claim 6, the operations further comprising:

determining a first value based at least in part on the first independent collision probability;

determining a collision start probability based at least in part on a greater of the first value and a minimum collision start probability;

determining a cost based on the collision start probability; and controlling the vehicle based on the cost.

12. The one or more non-transitory computer-readable media of claim 6, the operations further comprising:

determining a third probability distribution associated with a different object predicted position;

determining a second relative position probability distribution based on the first probability distribution and the third probability distribution;

determining a first cost based on the relative position probability distribution and a second cost based on the second relative position probability distribution; and controlling the vehicle based on the first cost and the second cost.

13. The one or more non-transitory computer-readable media of claim 6, wherein the first probability distribution and the second probability distribution are two-dimensional Gaussian probability distributions, and wherein the operations further comprise:

determining, as a relationship between the first probability distribution and the second probability distribution, at least one of:

a difference of random variables associated with the first probability distribution and the second probability distribution, a difference of means associated with the first probability distribution and the second probability distribution, or a difference of covariance matrices associated with the first probability distribution and the second probability distribution, and wherein the relative position probability distribution associated with the vehicle and the object is determined based on the relationship between the first probability distribution and the second probability distribution.

14. The one or more non-transitory computer-readable media of claim 6, the operations further comprising:

determining, based on the first independent collision probability and a tree structure, a cost associated with a trajectory, the tree structure representing a set of available actions for the vehicle to take to traverse an environment; and controlling the vehicle based on the cost.

15. The one or more non-transitory computer-readable media of claim 6, the operations further comprising:

determining a cost associated with the object based on the first independent collision probability; and controlling the vehicle based on the cost associated with the object and another cost associated with a second object.

16. A method comprising:

receiving a vehicle predicted position associated with a vehicle and a first probability distribution associated with the vehicle predicted position;

receiving an object predicted position associated with an object and a second probability distribution associated with the object predicted position;

determining, based at least in part on the first probability distribution and the second probability distribution, a relative position probability distribution associated with the vehicle and the object;

determining a first independent collision probability based at least in part on the relative position probability distribution and a distance from the vehicle predicted position to a point on the object; and controlling the vehicle based at least in part on the first independent collision probability.

17. The method of claim 16, wherein determining the first independent collision probability comprises:

determining the first independent collision probability based at least in part on a cumulative probability along a length of the distance from the vehicle predicted position to the point on the object.

18. The method of claim 16, wherein controlling the vehicle comprises:

determining a cost associated with a trajectory based at least in part on the first independent collision probability and a severity measure; and controlling the vehicle based at least in part on the cost associated with the trajectory.

19. The method of claim 18, wherein determining the severity measure comprises:

determining a first velocity associated with the vehicle and a direction, the direction being determined based at least in part on the vehicle predicted position and the object predicted position;

determining a second velocity associated with the object and the direction; and determining the severity measure based at least in part on the first velocity and the second velocity.

20. The method of claim 16, wherein the vehicle predicted position and the object predicted position are associated with a first time, and the method further comprises:

determining a first collision probability associated with the first time based on the first independent collision probability;

determining a second collision probability associated with a second time;

determining a cost based on the first collision probability and the second collision probability; and controlling the vehicle based on the cost.

* * * * *